June 24, 1930. E. O. SCHJOLIN 1,768,494
SPRING SUSPENSION
Filed Sept. 8, 1927

Inventor
Eric Olle Schjolin
By Blackwood, Spencer & Hill
Attorney

Patented June 24, 1930

1,768,494

UNITED STATES PATENT OFFICE

ERIC OLIE SCHJOLIN, OF BIRMINGHAM, MICHIGAN, ASSIGNOR, BY MESNE ASSIGNMENTS, TO YELLOW TRUCK & COACH MANUFACTURING CO., OF PONTIAC, MICHIGAN, A COMPANY OF MAINE

SPRING SUSPENSION

Application filed September 8, 1927. Serial No. 218,283.

This invention relates to a spring mounting and particularly to a mounting for a leaf spring of the type used on an automotive vehicle.

The object of this invention is to mount a spring on the chassis of an automotive vehicle in such a way that spring shackles will be unnecessary. More specifically it is an object of this invention to provide an effective mounting for a spring whereby one end of the spring may be rigidly connected to the chassis and the other end may be permitted limited longitudinal movement to compensate for bending of the spring. Such a structure is simpler and cheaper to manufacture than the usual spring shackle, and is more durable and less liable to break or become loose and cause rattling.

Other objects and advantages of the invention will appear in the course of the following description taken in connection with the accompanying drawing and appended claims.

Figure 1:
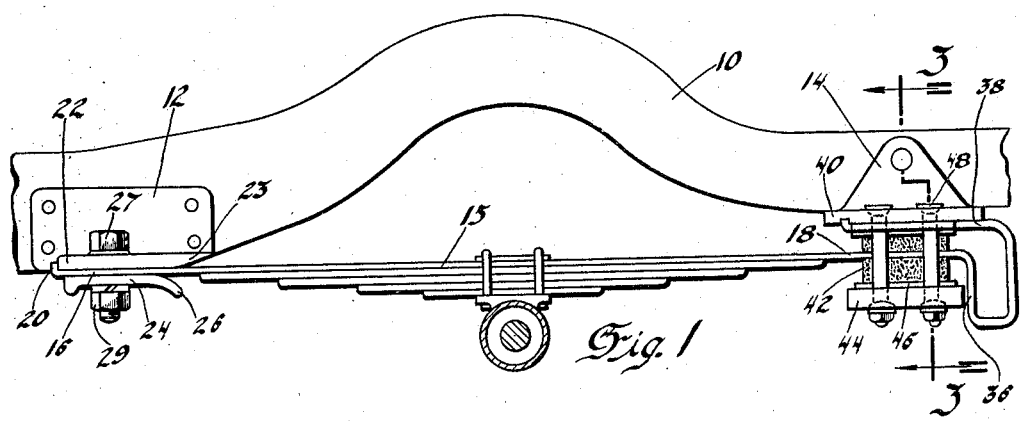
Figure 1 is a side view of a spring suspended in accordance with my invention and attached to the chassis bar of an automotive vehicle.
Figure 2:
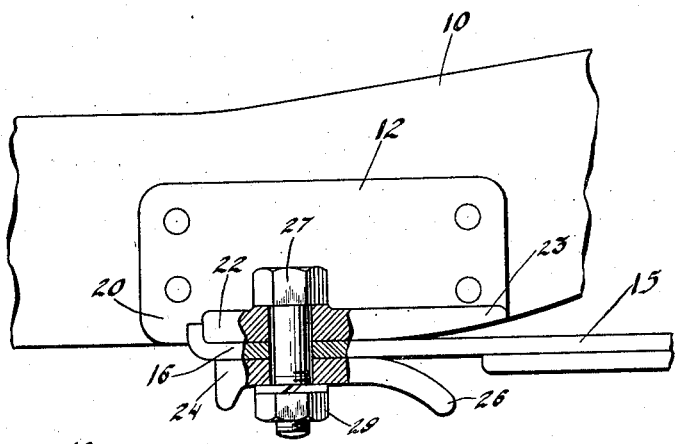
Figure 2 is an enlarged detail view of the rigid connection at the front end of the spring.
Figure 3:
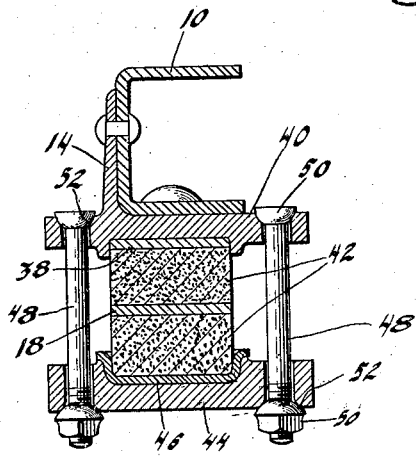
Figure 3 is a sectional view on the line 3—3 of Figure 1 showing in detail the resilient connection.

Referring to the drawing the numeral 10 denotes the longitudinal side member of the chassis of an automotive vehicle and 12 and 14 the front and rear brackets respectively for suspending the ends 16 and 18 of the spring 15. The upper leaf of the spring at the end 16 is bent as at 20 around the projecting portion 22 of the bracket 12. The projection 22 has its rear end 23 rounded to allow for bending of the top leaf of the spring. Underlying the end 16 is a clamping plate 24 having a downwardly bent or curved end 26 also to allow for bending of the spring 15. The projecting portion 22, spring end 16 and clamping plate 24 have openings for the reception of a bolt 27 having a nut 29 to hold the parts together. It is to be noted that this connection is rigid and holds the spring end 16 immovable.

The opposite end 18 of the spring 15 has a downwardly extending loop 36 and is return bent as at 38 to overlap the end portion 18. The bracket 14 has an extension 40 which projects over the return bent end 38, and above and below the end 18 there are resilient blocks 42, preferably of rubber. Under the lower block 42 there is a clamping plate 44 provided with a sunken portion in which is placed the flanged metallic cup-shaped washer 46 which holds the lower part of the lower block 42 against undue displacement. The extension 40 of the bracket 14 is grooved for reception of the reversely bent portion 38 of the top leaf of the spring. The plate 44 and extension 40 carry between them the end of the top leaf of the spring and the two blocks 42 and are held together by side bolts 48, there being two side bolts on each side of the bent spring end. The heads and nuts 50 of the four bolts are rounded on their inner or adjacent sides for fitting smoothly in similarly rounded seats 52 on the outer sides of the plate 44 and extension 40 of the bracket 14. By this arrangement the plate 44 is permitted to swing longitudinally but remains parallel to the extension 40.

As the spring bends the end 18 must move toward the left, as shown in Figure 1, since the other end is rigidly connected to the frame. As the end 18 pulls on the rubber blocks and moves the plate 44 to the left the blocks are compressed and tend to return the spring to its original position.

I claim:

1. In a spring suspension, a spring having one end in the general plane of the spring and rigidly clamped, a resilient suspension for the other end, and an integral return bent portion on said resiliently suspended end.

2. In a spring suspension, a spring having one end rigidly clamped, a resilient suspension for the other end, said resilient suspension comprising blocks of resilient material above and below said end, and a return bent portion on said end overlapping one of said resilient blocks.

3. In a spring suspension, a spring having one end rigidly clamped, said rigid connection comprising a bracket, a plate below said bracket and a bolt passing through said spring end, bracket and plate, a resilient connection at the opposite end of said spring, said resilient connection comprising blocks of resilient material above and below the spring end, and a return bend on said spring end, said bend overlapping one of said resilient blocks.

4. In a spring suspension, a spring having a resiliently suspended end, said resilient suspension comprising a bracket, a block of resilient material above and below said spring end, a plate below said lower block, a return bend on said spring, said return bend extending between said bracket and upper resilient block and means for holding said parts together.

5. In a spring suspension, a bracket overlying one end of the spring, a plate below the spring, means for rigidly securing the bracket, spring and plate together, a bracket at the opposite end of the spring, a return bent portion on said spring overlapping said second bracket, resilient blocks placed above and below said second mentioned spring end, a plate below said lower block and means to secure said bracket, spring, blocks and plate together.

6. In a spring suspension, a frame member, a plate connected with said frame member for longitudinal surging movement, blocks of resilient material between said frame member and plates, and a spring member having one end connected with the frame member, the other end extending between said blocks and connected to said frame members.

7. In a spring suspension, a spring having a resilient connection at one end, said connection including a bracket attached to the chassis frame of a vehicle, a return bend on said end seated against said bracket, resilient means at opposite sides of said end, a plate below said end, and means to secure said plate to said bracket and confine the resilient means and spring end therebetween.

8. In a spring suspension, a resilient connection at one end of said spring comprising resilient blocks above and below said end, a plate below said lower block, a bracket over said upper block, and means to secure said plate and bracket together but permitting limited movement of said plate relative to said bracket.

9. The structure of claim 8, said end having a return bent portion overlapping one of said blocks.

10. The structure of claim 8, said end having a return bent portion forming a loop, said return bent end overlapping the upper block.

11. The structure of claim 8, said means passing through said plate and bracket outside said spring end.

12. In a spring suspension, a spring having one end formed as a substantially straight continuation of the spring, means for rigidly clamping said end, a resilient suspension at the other end of the spring, and a return bent portion on said resiliently suspended end.

In testimony whereof I affix my signature.

ERIC OLIE SCHJOLIN.